United States Patent [19]

Chapman

[11] Patent Number: 5,054,837
[45] Date of Patent: Oct. 8, 1991

[54] VEHICULAR CHILD DIVIDER APPARATUS

[76] Inventor: Dorothy L. Chapman, P.O. Box 5037, Westport, Oreg. 97016

[21] Appl. No.: 493,693

[22] Filed: Mar. 15, 1990

[51] Int. Cl.$^5$ .............................................. B60N 3/00
[52] U.S. Cl. .................................. 296/24.1; 160/351; 49/463
[58] Field of Search ............... 296/24.1; 160/219, 221, 160/222, 327, 351; 49/463, 465; 52/239; 108/44

[56] References Cited

U.S. PATENT DOCUMENTS

| Re. 29,264 | 6/1977 | Woodward | 296/159 |
|---|---|---|---|
| 1,393,359 | 10/1921 | Haon | 296/37.13 |
| 1,486,566 | 3/1924 | Crecelius | 224/42.46 R X |
| 1,523,323 | 1/1925 | Wensinger | 296/37.13 |
| 1,611,248 | 12/1926 | Smith et al. | 296/24.1 |
| 1,727,485 | 9/1929 | Salley | 224/273 |
| 1,815,028 | 7/1931 | Burch | 224/273 |
| 1,995,143 | 3/1935 | Burch | 296/37.13 |
| 2,219,412 | 10/1940 | Dean | 296/24.1 |
| 2,741,521 | 4/1956 | Bell et al. | 108/44 X |
| 2,855,037 | 10/1958 | Stiffel | 160/351 X |
| 3,044,800 | 7/1962 | Wicker | 296/24.1 X |
| 3,151,649 | 10/1964 | Mitchell, Jr. | 224/42.46 R X |
| 3,441,309 | 4/1969 | Halstead et al. | 296/24.1 |
| 3,466,082 | 9/1969 | Branch | 296/164 |
| 3,510,164 | 5/1970 | Setina | 296/24.1 |
| 3,556,589 | 1/1971 | Messier | 108/44 X |
| 3,625,161 | 12/1971 | Rosner | 108/44 |
| 3,652,120 | 3/1972 | Bernbach | 296/24.1 |
| 4,015,875 | 4/1977 | Setina | 296/24.1 |
| 4,065,166 | 12/1977 | Shoemaker | 296/159 |
| 4,173,369 | 11/1979 | Roggin | 296/24.1 |
| 4,595,227 | 6/1986 | Setina | 296/24.1 |

Primary Examiner—Margaret A. Focarino
Assistant Examiner—Andrew C. Pike
Attorney, Agent, or Firm—Leon Gilden

[57] ABSTRACT

An apparatus for dividing a common seat between a plurality of children includes a planar panel including mounting apparatus to secure the panel in an orthogonal relationship relative to an associated seat. The mounting apparatus includes "J" shaped type members to secure the panel to an adjacent vertical portion of an associated seat, as well as telescoping members to engage opposed surfaces to frictionally engage such surfaces to maintain the panel in a fixed orientation. The panel optionally includes an opening provided with an open mesh framework to permit visual association between the children, as well as pockets for such children to position various items during a travel procedure.

1 Claim, 5 Drawing Sheets

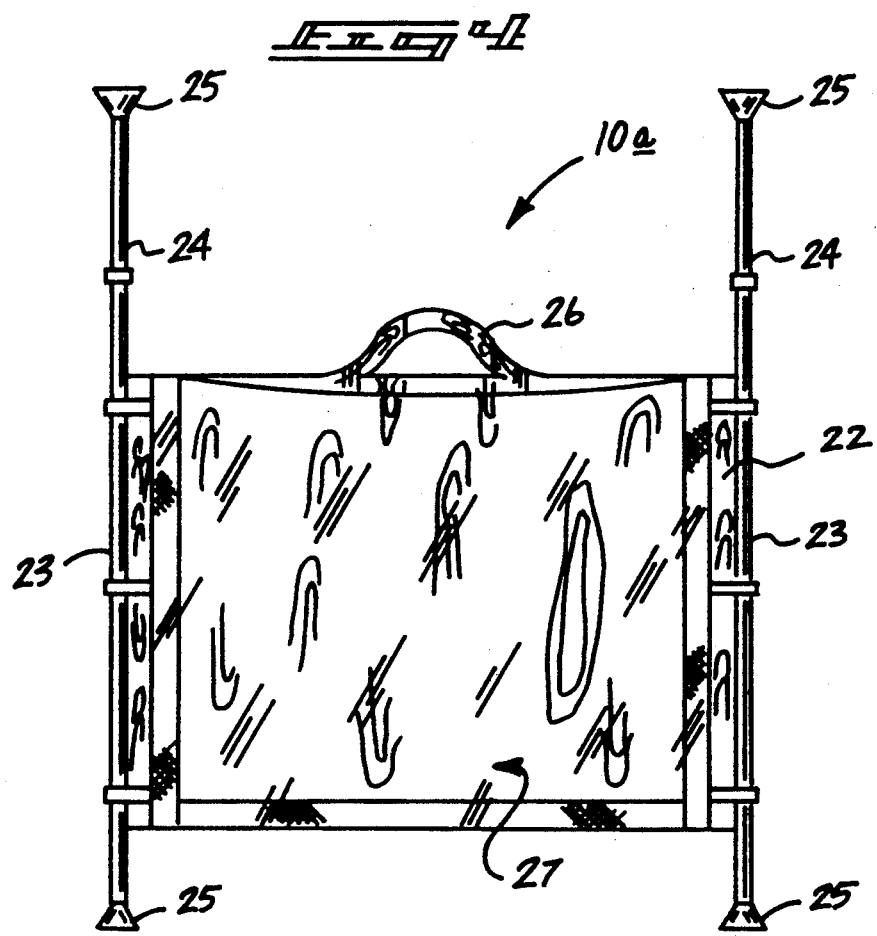
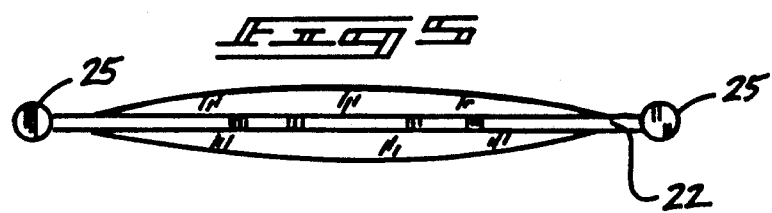

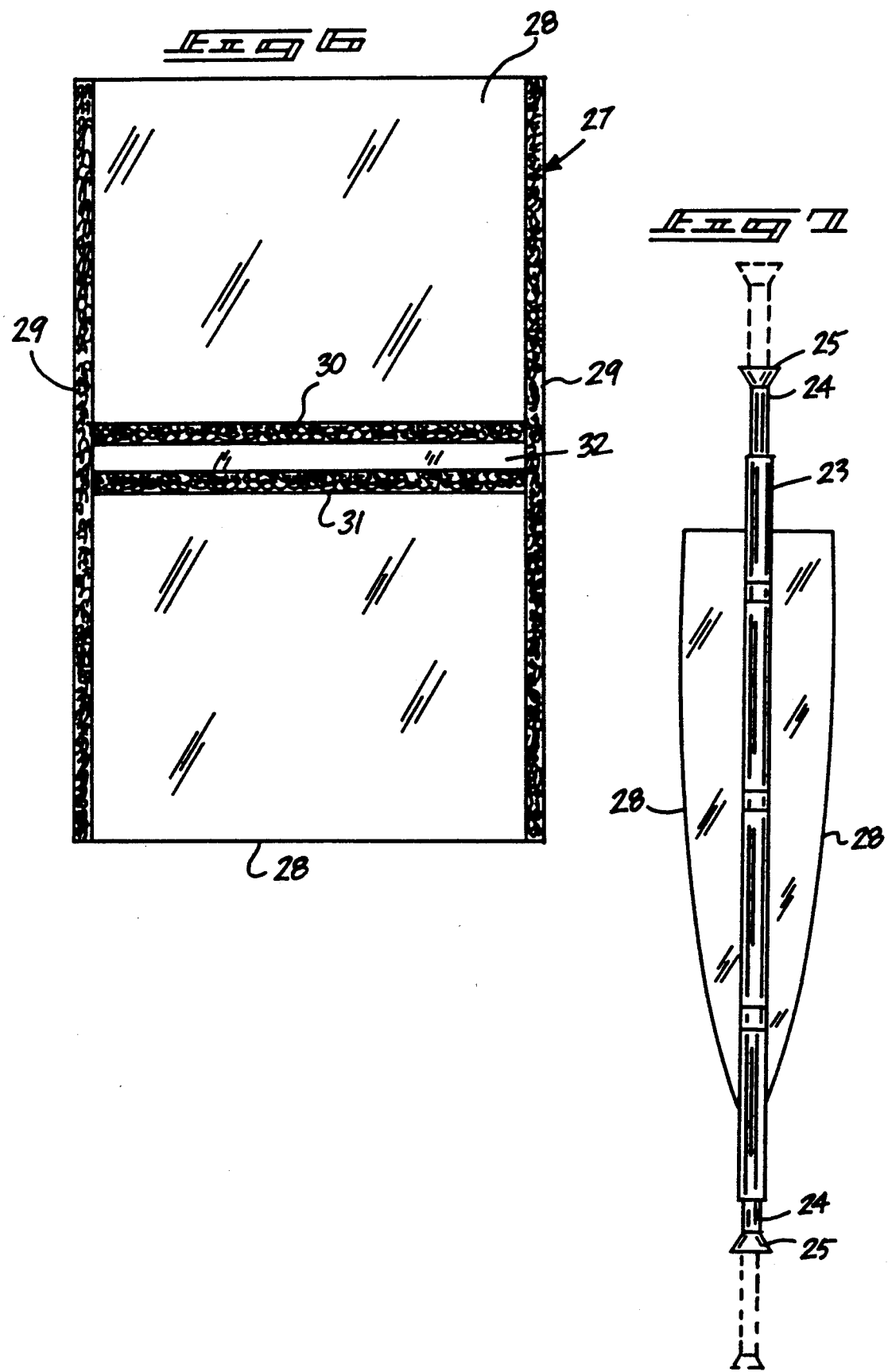

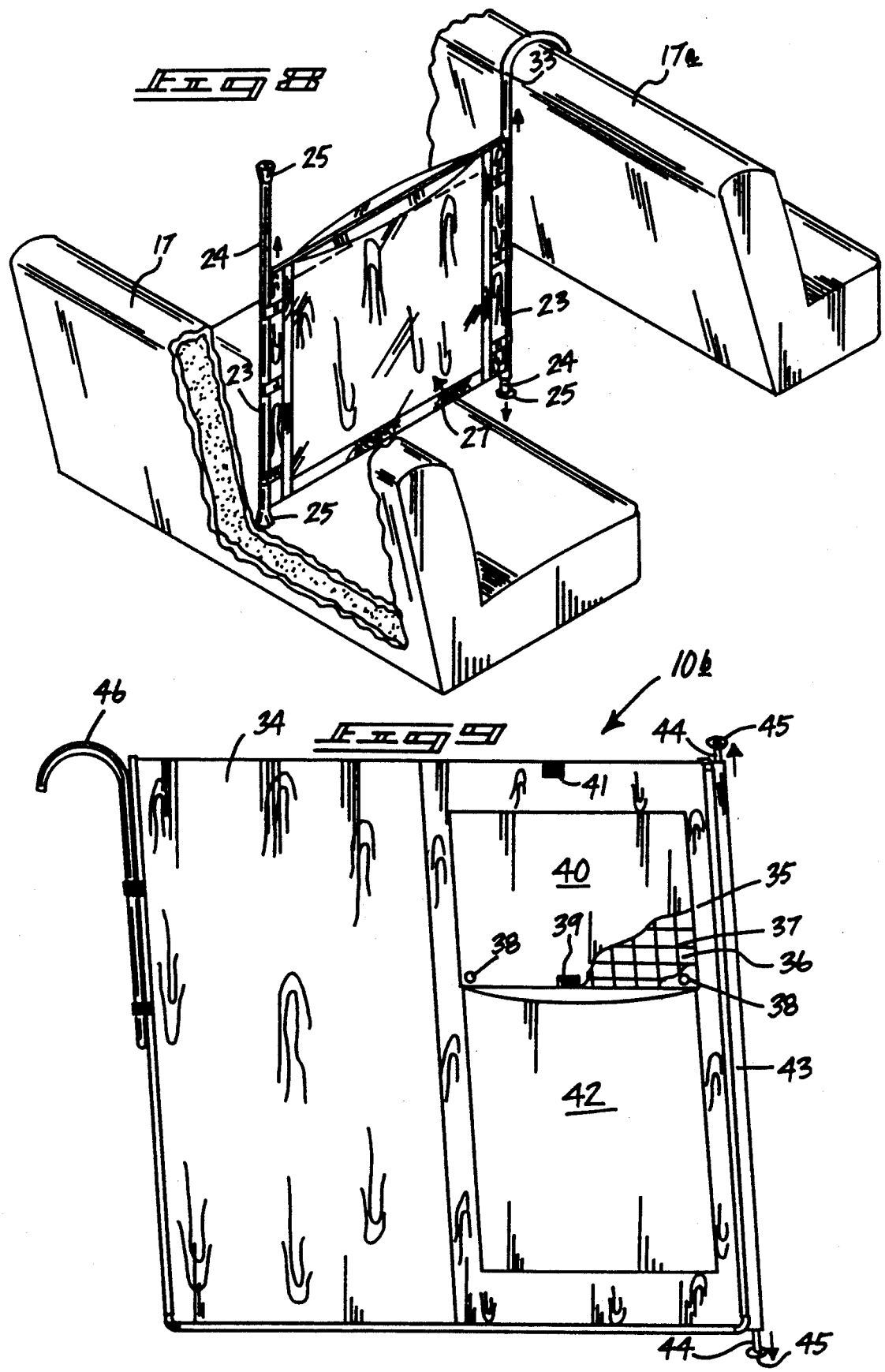

VEHICULAR CHILD DIVIDER APPARATUS

BACKGROUND OF THE INVENTION

1. Field of the Invention

The field of invention relates to separator apparatus, and more particularly pertains to a new and improved vehicular child divider apparatus wherein the same permits selective division of a common seat between children, wherein the apparatus is selectively and securably mounted relative to the associated seat.

2. Description of the Prior Art

Vehicular divider walls have been utilized in the prior art. It is frequently desirable in various vehicular usage to provide protective barriers between various portions and components of the internal vehicular compartment. During travel with children and the like, it is frequently desirable to keep individuals from physical contact from one another due to the inherent nature of such children to become distracting to an attendant or driver of an associated vehicle. To this end, a readily positionable divider apparatus is desirable to have available to divide such children between various portions of an interior compartment of an automobile. Example of prior art dividers include U.S. Pat. No. 4,595,227 to Settina wherein a generally "Z" shaped divider is provided positionable within an automobile to separate an operator thereof from the passenger compartment.

U.S. Pat. No. 3,044,800 to Wicker sets forth a cage-like divider to divide a frontal passenger compartment from a rear passenger compartment in an automobile.

U.S. Pat. No. 4,509,788 to Jan, et al., sets forth a safety device for protectively dividing a taxi driver seat from the remainder of the passenger compartments and defines a ventilated "L" shaped configuration.

U.S. Pat. No. 3,667,801 to Setina sets forth a partition window arranged between a front seat and a rear seat of an automobile interiorly thereof.

U.S. Pat. No. 4,708,384 to LaRosa sets forth a separator screen to divide a front and rear section of an automobile and securing the same utilizing "L" shaped brackets.

As such, it may be appreciated that there continues to be a need for a new and improved vehicular child divider apparatus wherein the same is readily securable and removable from an interior compartment of an automobile and as such, the present invention substantially fulfills this need.

SUMMARY OF THE INVENTION

In view of the prior art, the present invention provides a vehicular child divider apparatus wherein the same is readily stored during periods of non-use and easily mounted within an interior compartment of an automobile to divide a common seat within an automobile interior.

To attain this, the present invention provides an apparatus for dividing a common seat between a plurality of children including a planar panel with mounting apparatus to secure the panel in an orthogonal relationship relative to an associated seat. the mounting apparatus includes "J" shaped type members to secure the panel to an adjacent vertical portion of an associated seat, as well as telescoping members to engage opposed surfaces to frictionally engage such surfaces to maintain the panel in a fixed orientation. The panel optionally includes an opening provided with an open mesh framework to permit visual association between the children, as well as pockets for such children to position various items during a travel procedure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is another object of the present invention to provide a new and improved vehicular child divider apparatus which may be easily and efficiently manufactured and marketed.

It is a further object of the present invention to provide a new and improved vehicular child divider apparatus which is of a durable and reliable construction.

An even further object of the present invention is to provide a new and improved vehicular child divider apparatus which is susceptible of a low cost of manufacture with regard to both materials and labor, and which accordingly is then susceptible of low prices of sale to the consuming public, thereby making such vehicular child divider apparatus economically available to the buying public.

Still another object of the present invention is to provide a new and improved vehicular child divider apparatus wherein the same is readily secured to an interior compartment of an automobile to divide a common seat within the automobile between a plurality of children.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an orthographic view taken in elevation of a further organization utilized by the instant invention.

FIG. 5 is a top orthographic view of the invention as illustrated in FIG. 4.

FIG. 6 is an orthographic view of a covering panel utilized by the invention as illustrated in FIG. 4.

FIG. 7 is an orthographic side view taken in elevation of the invention, as illustrated in FIG. 4.

FIG. 8 is an isometric illustration of a modification of the instant invention utilizing a modified engagement leg mounted to forward seat of an automobile.

FIG. 9 is an orthographic side view taken in elevation of a yet further modification of the instant invention.

DESCRIPTION OF THE PREFERRED EMBODIMENT

Figure 1:
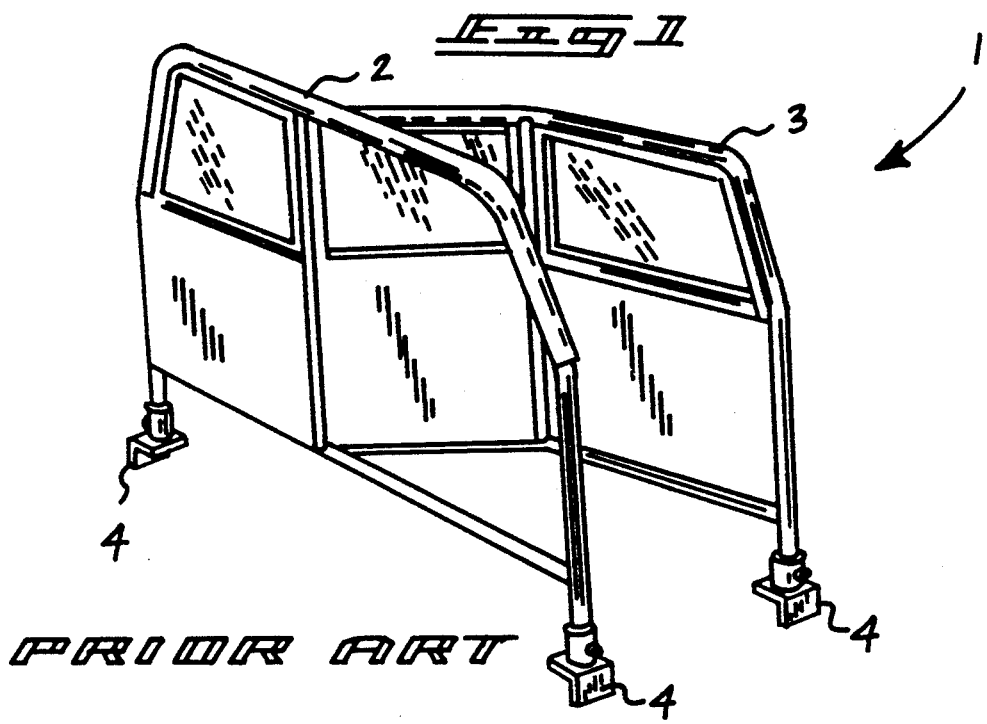
FIG. 1 is an isometric illustration of a prior art vehicular divider apparatus.

With reference now to the drawings, and in particular to FIGS. 1 to 9 thereof, a new and improved vehicular child divider apparatus embodying the principles and concepts of the present invention and generally designated by the reference numerals 10, 10a, and 10b will be described.

Figure 2:
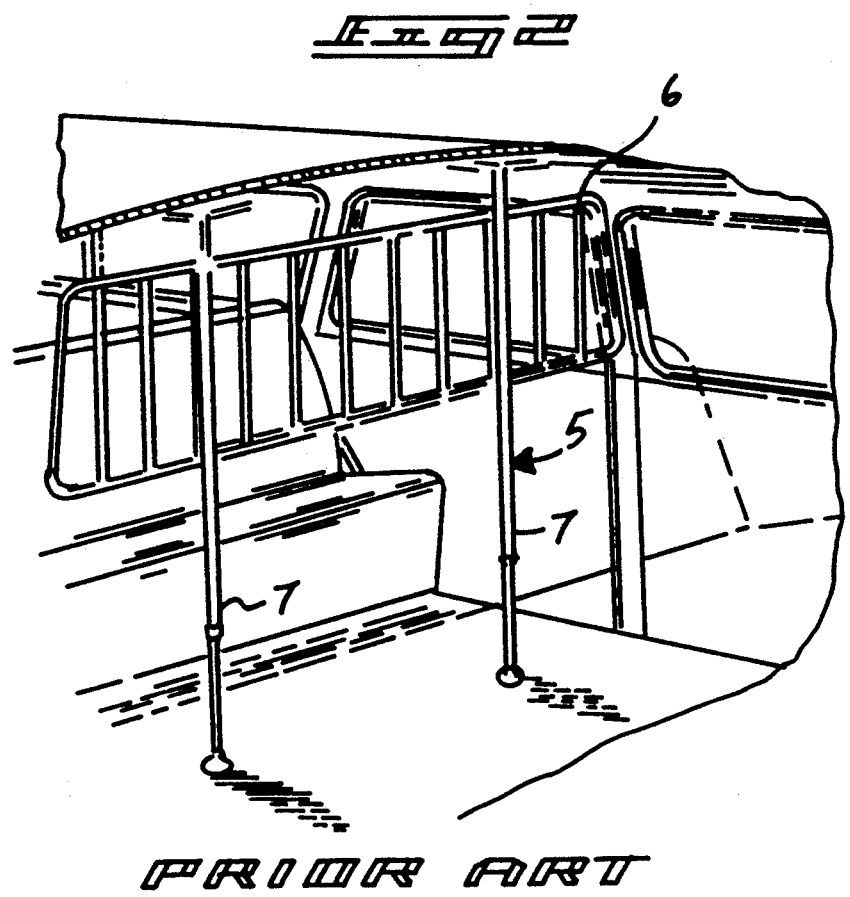
FIG. 2 is an isometric illustration of a further example of a vehicular divider apparatus.
Figure 3:
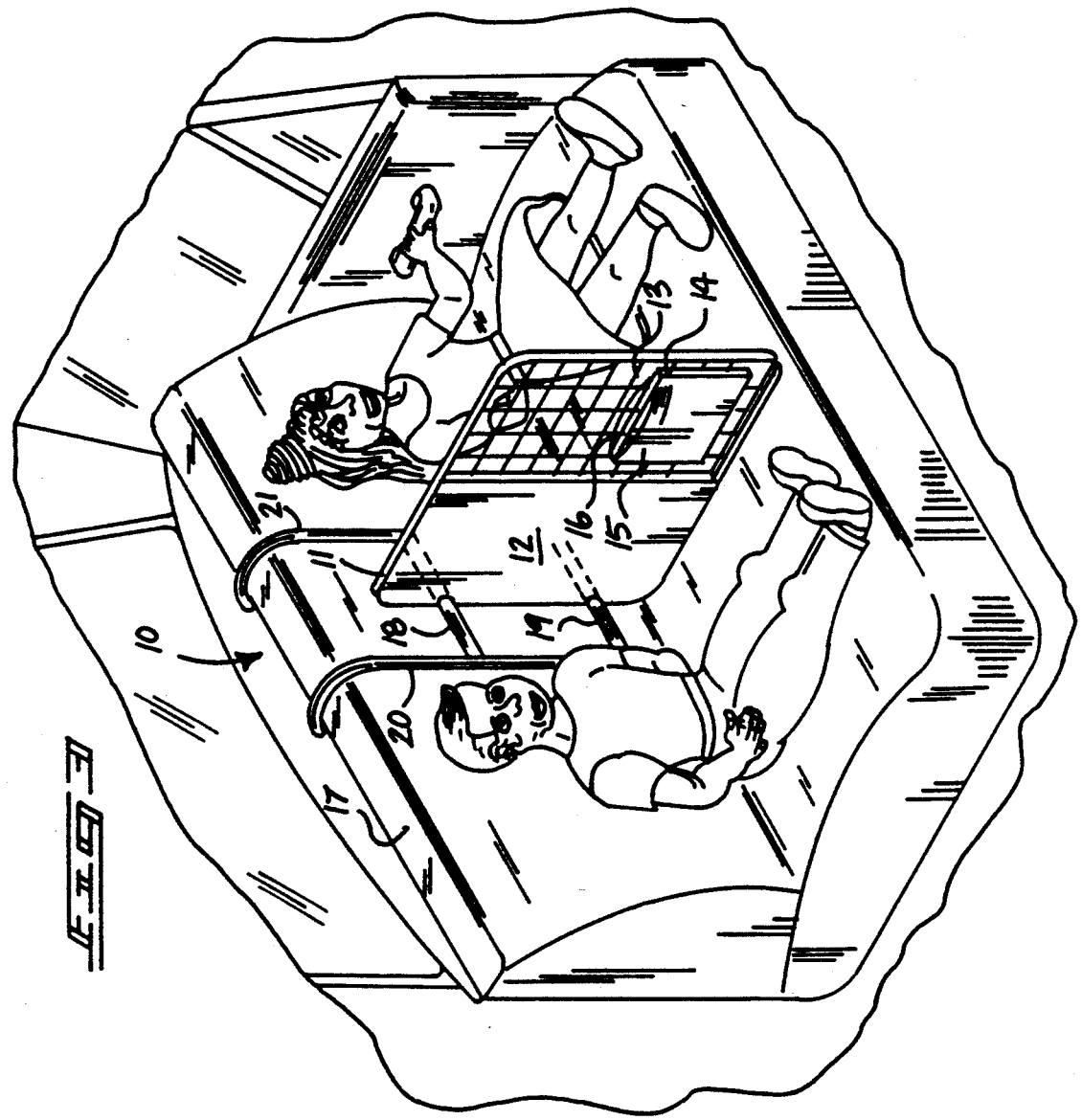
FIG. 3 is an isometric illustration of the instant invention.

FIG. 1 illustrates a prior art vehicular separator 1 for use interiorly of a vehicle, wherein a generally first frame 2 is joined with a second frame 3 to define a "Z" shaped organization utilizing flange members 4 to mount the organization to a door sill organization of an automobile to divide a driver from passengers therewithin. FIG. 2 illustrates a further prior art vehicular divider 5, wherein a cage member 6 separates a forward portion of an automobile from a rear portion thereof utilizing telescoping leg member 7.

More specifically, the vehicular child divider apparatus 10 of the instant invention essentially comprises a rigid rectangular framework 11 including a rear rigid planar panel 12 arranged vertically and orthogonally dividing a generally "L" shaped rear automotive seat 17, wherein the rigid planar panel 12 includes a coextensive and open mesh web 13 completely filling the rectangular frame 11 forwardly of the rigid planar panel 12. The open mesh web 13 permits visual observation of the children relative to one another, as illustrated, and includes a rigid lower panel 14 positioned at a lowermost portion of the mesh web 13. The rigid lower panel 14 includes a respective first and second pocket 15 and 16 mounted coextensively with the surface of each panel on each side of the web 13 to permit securement of various articles and the like for temporary storage by children within the compartments separated by the divider apparatus. A first and second horizontal bar 18 and 19 are orthogonally directed adjacent a rear edge of the panel 12 and are medially bisected by the panel 12 and extend outwardly therefrom and include a first and second inverted "J" shaped bar 20 and 21 respectively interconnecting opposed terminal ends of the first and second horizontal bars 18 and 19, wherein the "J" shaped bars are directed rearwardly to overlie an upper edge surface of the automotive seat 17, as illustrated.

FIGS. 4–8 illustrate the invention utilizing a central rigid panel 22 including a transparent cover panel 27 mounted thereon, wherein the transparent cover panel is provided to provide a readily removable and maintainable panel mounted relative to the central panel 22. A central tube 23 is fixedly mounted to each vertical edge of the central panel 22, including a telescoping leg member 24 mounted reciprocatably and exteriorly from each end of the tube 23. A resilient foot member 25 is mounted to each remote terminal end of each leg member 24. A handle 26 is mounted medially and coextensively upwardly of an upper edge of the central panel 22 for means of transport of the organization. The transparent panel 27 includes a plurality of spaced panels 28 defined by a surface area substantially equal to that of the surface area of each side of the central rigid panel 22. First spaced parallel hook and loop fastener strips 29 are mounted to opposed interior longitudinal end surfaces of the transparent cover panel 27 and cooperative with associated hook and loop fastener strips mounted on the central panel 22. A second hook and loop fastener strip 30 is spaced from a third hook and loop fastener strip 31 directed orthogonally across the transparent cover panel 27 defining a central panel strip 32 defining a surface area substantially to that of an end edge of the central panel 22. The central panel 22 is provided with corresponding hook and loop fastener strips cooperative with the second and third hook and loop and fastener strips 29 and 30 to permit securement of the transparent panel thereon. A "J" shaped external leg 33, as illustrated in FIG. 8, is for optional use with the forward central tube 23 to engage an upper end of a forward "L" shaped automotive seat 17a.

FIG. 9 illustrates a further modified divider apparatus 10b including a first planar rigid panel 34 coextensive with a second panel 35. The second panel 35 includes a through-extending opening 36 with a mesh web 37 mounted coextensively therewith. The mesh web includes a cover panel 40 selectively positionable thereover, with snap fasteners 38 mounted at each free end corner thereof cooperative with associated fasteners mounted on the panel 35. A first hook and loop cover panel fastener 39 is selectively cooperative with a second hook and loop fastener 41 mounted overlying the cover panel 40 adjacent an upper end edge of the second panel 35 to permit selective retraction of the cover panel 40 relative to the opening 36. An underlying pocket 42 is mounted generally coextensively with the second panel 35 underlying the opening 36. A tubular support 43 (or central tube) is mounted coextensive with an edge of the second panel 35, including extensible legs 44 directed telescopingly therefrom utilizing friction pads 45 to permit selective securement to opposed surfaces of an automobile, such as a floor and roof panel. A "J" shaped hook 46 is mounted in an inverted configuration to an end edge of the first panel 34, and wherein the "J" shaped leg extends coextensively with the first panel 34. The "J" shaped leg or hook 46 permits securement relative to the forward seat 17a in a manner as illustrated in FIG. 8.

Further, the apparatus 10a, as illustrated in FIGS. 4–8, utilizes the transparent cover panel 27 as a storage mechanism, wherein the transparent panel 27 is not secured at its upper end edges when mounted to the central panel 22, and wherein the perimeter securement of each of the transparent panel portions 28 provides pocket members when attached to the central panel 22 for storage of various items therewithin.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular child divider apparatus in combination with a single "L"-shaped seat within an automotive passenger compartment, wherein the single "L"-shaped seat is positioned rearwardly of a forward seat, and the apparatus includes a central rigid planar panel, the planar panel including a rear vertical edge, the rear vertical edge including securement means mounted thereto, the planar panel including a further panel mounted coextensively with a forward edge of the planar panel and the further panel extending forwardly and coextensively aligned with opposed side surfaces of the planar panel, the further panel including a forward edge, and the forward edge of the further panel including a further securement means mounted coextensively with the forward edge of the further panel, and wherein the further securement means includes an inverted "J" shaped hook member mounted to the further panel, wherein the "J" shaped hook member is securable overlying the forward seat, and wherein the securement means includes a central tube, the central tube includes a plurality of leg members telescopingly mounted to the central tube, and each leg member includes a friction pad mounted to a free terminal end of each leg member extending exteriorly of the central tube, and wherein the planar panel includes a through-extending opening, and the through-extending opening includes a mesh member coextensively mounted within the opening, and including a covering flap selectively overlying the opening, the covering flap including a plurality of snap fasteners mounted to remote lower end portions of the covering flap, and further including a first hook and loop fastener member mounted intermediate of the snap fasteners adjacent a lower terminal edge of the covering flap, and a further hook and loop fastening member mounted adjacent an upper end edge of the planar panel positioned above the covering flap for selective securement of the covering flap spaced from the opening, and including an elongate pocket for storage mounted underlying the opening along the planar panel.

* * * * *